United States Patent

[11] 3,620,591

| [72] | Inventor | Emmet D. Riggs<br>Dallas, Tex. |
|---|---|---|
| [21] | Appl. No. | 843,538 |
| [22] | Filed | July 22, 1969 |
| [45] | Patented | Nov. 16, 1971 |
| [73] | Assignee | Atlantic Richfield Company<br>New York, N.Y. |

[54] OPTICAL PROCESSING OF DATA
3 Claims, 3 Drawing Figs.

[52] U.S. Cl. ............................................. 350/6,
350/162 SF, 350/269, 340/15.5
[51] Int. Cl. .................................................. G02b 17/00
[50] Field of Search ............................................. 340/15.5,
189; 350/162, 6, 247, 269

[56] References Cited
UNITED STATES PATENTS

| 3,288,018 | 11/1966 | Belchis et al. | 350/162 |
| 3,370,268 | 2/1968 | Bobrin et al. | 340/15.5 |
| 3,432,218 | 3/1969 | Loughridge et al. | 350/247 |
| 3,497,287 | 2/1970 | Lang | 350/162 |

OTHER REFERENCES

Kozma & Kelly, Applied Optics, 4–1965, pp. 391 Wildey, Astronomical Society of the Pacific, 6–1967, pp. 220– 225

Primary Examiner—Rodney D. Bennett, Jr.
Assistant Examiner—S. C. Buczinski
Attorneys—Blucher S. Tharp and Robert E. Lee, Jr.

ABSTRACT: A method and apparatus for optically processing seismic or other data by spatial filtering in order to discriminate against optical noise and enhance recoverable information. Optical elements acting on the seismic signals are mounted in special assemblies and rotated at different angular velocities with respect to one another. A series of partial exposures are made of the output information at selected time intervals and added to give a composite exposure. Also disclosed is a preferred process for preparing spatial filters by photographic reduction.

INVENTOR
Emmet D. Riggs

BY Robert Ellsworth Lee
ATTORNEY

OPTICAL PROCESSING OF DATA

BACKGROUND OF THE INVENTION

The present invention pertains to optical processing and particularly concerns operating on seismic data by means of spatial filtering.

The following articles are referred to by way of background material:

J. C. Fitton and M. B. Dorbin, "Optical Processing and Interpretation," *Geophysics*, Vol. 32, pp. 801–818 (Oct. 1967).

M. B. Dorbin, A. L. Ingallis, and J. A. Long, "Velocity and Frequency Filtering of Seismic Data Using Laser Light," *Geophysics*, Vol. 30, pp. 1144–1178 (Dec. 1965).

The transformation properties of a lens which allows interchange of frequency-plane components with space-plane has led to the development of some useful optical data processing equipment and technology. The optical method offers a promising approach to processing of seismic data, but there yet remains several problems which must be overcome.

One of the major problems with optical data processing is that optical noise is generated by the process itself. This noise is of several types, but the most common is a series of overlapping defraction rings which are caused by bubbles and pits in the glass of the lens, by dust particles, and by invisible irregularities in the lens surfaces. Many of these defects and inhomogeneities are too minute to be observed under a microscope, yet contribute significantly to higher frequency components of the noise.

As in all quests for perfection, it is impossible to fabricate a perfect lens. Even the best (multielement) photographic optics are generally no better for this application than lens produced for less exacting optical requirements. Having an increased number of elements merely increases the possibility of inclusion of minute bubbles and trash in the cementing material and the chance for dust trouble. With increased filtering, the optical noise becomes more evident so that additional processing compounds rather than corrects the problem.

This noise problem exists even in the best commercially available optical processing equipment. It is avoided rather than solved by doing very little actual filtering (generally no more than 10 percent of the input energy is removed so that the optical noise does not become obvious). An effective filtering job, however, requires much more filtering than this in order to have practical utility. Unfortunately, however, as more filtering is done, the optical noise becomes more pronounced and may obscure the desired information.

C. E. Thomas has suggested that noise can be reduced to a tolerable level by time averaging (*Applied Physics*, Mar 1968, pp. 517–522). The optical system is perturbed in such a way that the spatial noise at the output of the system varies with time, while the signal remains stationary. The output sensor then integrates the time varying light pattern, thereby averaging out much of the noise. This is done by rotating a tilted glass plate in front of the input transparency so as to vary the standing wave pattern due to optical imperfections.

While the rotating glass plate readily reduces coherent noise, it generates a more difficult spatial filtering problem since it causes the entire transform image to move. Hence, for effective spatial filtering, the filter must synchronously move with the transform plane motion, i.e. at exactly the same angular velocity in order to keep to the same band pass. In practice, signals are generally time averaged along with the noise, degrading the transmitted information. If the movement is enough to cause the zero order to move to an opaque area of the filter, there is a violent change in contrast.

Another problem area has been the technique of spatial filtering. The subject of filtering in the transform plane is adequately covered in a number of textbooks. Usual practice is to enlarge the transform using a magnifying lens (called a relay lens) prior to filtering the transform. Thus, relatively large mechanical filters can them be employed in the form of fan-shaped fingers, wedges, etc., to block selected portions of the diffraction pattern. Superficially, this arrangement seems ideal; however, there is a major inherent difficulty. The introduction of the transform magnifying lens unfortunately produces another source of extraneous noise. It would be preferable if the magnification (transform enlargement) step could be eliminated and the original transform operated upon directly. But this would necessitate the use of special "microfilters" presently unknown.

Applicant has solved these and other problems by means of the present invention as set forth below.

SUMMARY OF THE INVENTION

The exposure of a photographic emulsion is a function of time. If an optical system is disturbed or changed in some way so that the signal is added in time while the noise components are distributed or "smeared" in time, then a marked improvement in the signal-to-noise ratio is possible. This is because the log exposure-density curve of any photographic material is nonlinear. If multiple exposures are taken and the signals added, the noise can be made to remain in the nonlinear toe of this curve while the summation signal is moved up into the upper (linear) portion. In other words, the noise varies with time and is diminished while the signal remains stationary and is enhanced.

In textbook derivations, ray diagrams are drawn around an optical axis. In fact, ray computations are still the method by which lens surfaces are designed by the most sophisticated computer programs. If the physical lens is assumed to be symmetrical, then it can be rotated around its optical axis without disturbing the image formed by the lens.

By applying the above principles, applicant has solved the problem of optical noise in spatial filtering. The optical elements acting on the input signals (e.g. the beam expander, transform objective, etc.) are synchronously rotated at different relative angular velocities. A series of partial exposures of the output information is recorded on image detector means at each of a preselected number of incremental rotational steps. Combining or adding the resulting partial exposure gives a composite exposure characterized by an improved signal-to-noise ratio.

Preferably, the aforesaid method is carried out by discontinuing or interrupting rotation of the elements at predetermined time intervals so that the partial exposures can be recorded during each rotational pause. This minimized vibrational disturbances during the several exposures, further improving the signal-to-noise ratio. However, if desired, the exposure can be made continuously during the rotation, thereby smearing the optical noise across the image detector means.

Another aspect of the invention concerns apparatus for automatically carrying out the above method. Essential components for optically processing include a source of coherent light; a photographic shutter; a transparency containing input information; various optical elements including a beam expander, transform objective, and reconstruction (image recovery) objective; and image detector means (e.g. a photographic plate). Applicant has added improvements including an automatic cocking and release means connected to the shutter; rotatable mounts for the beam expander and transform and reconstruction objectives; synchronous motors for driving each of the rotatable mounts; first and second rotary switch means for actuating the cocking and release means and said synchronous motors, respectively; an electric motor for synchronously rotating the first and second rotary switch means; and an interval timer to shut off the apparatus after a predetermined time.

Applicant's automatic equipment accomplishes the following:

1. Cocks the shutter.
2. Stops rotation of the lens mounts after a set time.
3. Releases the shutter to expose the plate.
4. Starts rotation of the lens mounts.
5. Completes steps (1) through (4) a predetermined number of times.

6. Shuts off power to all operational components.

Another aspect of applicant's invention is a novel optical element assembly for use in the above apparatus. Each assembly comprises a frame member, an optical element (e.g. lens) mount, and a synchronous motor. The frame attaches to an optical bench and includes a bearing in which the optical element mount is rotatably mounted. The synchronous motor is attached to the frame member and turns a drive pulley. Motion transfer means (e.g. a belt) connects the drive pulley and the optical element mount. The mechanical dimensions of the drive pulley determine the angular velocity of the optical element mount.

Still another aspect of the present invention is a process for preparing spatial filters or masks for removing unwanted frequencies from the input data. A selection of two-dimensional transforms of known frequency reference signals is prepared for a given set of operating parameters. A target backboard is then made using the reference transforms to designate particular areal regions as indicative of signals having certain frequency ranges. For each frequency range there are corresponding areal regions lying above and below and equally spaced from a reference axis passing through the center of the backboard. The frequencies which are to be eliminated are effectively masked or covered with black tape and a photographic reduction is made so hat a transparency is obtained showing the masked regions as darkened areas. A hole or aperture having a preselected critical diameter is then punched in the center of the transparency to establish an upper frequency band-pass limit for the DC component.

By use of applicant's aforenoted inventions, the major problems associated with optical processing of seismic data have been overcome. Application of these techniques provides results previously not obtainable by optical methods. For example, a one percent signal has been extracted from a noise background using an ordinary optical lens. This opens the doors to a new dimension in data processing.

In addition to processing seismic data, the aforestated processes can be advantageously used to process any data which has a sequential form or is repetitive, e.g. satellite transmissions; geological photographs showing strike and/or dip; photographs of recorded wave motion; etc.

BRIEF DESCRIPTION OF THE DRAWINGS

FIG. 2 is a drawing of applicant's optical element assembly for rotating lens and the like.

DESCRIPTION OF THE PREFERRED EMBODIMENT(S)

The diffraction of an object is the Fourier transform of that object. A diffraction of the Fourier transform is the object itself. If the object is a transparency of a seismic section, the Fourier transform obtained by coherent illumination of the object is a two-dimensional frequency-wave number plot of the seismic section. A second diffraction taken of the frequency-wave number information in the transform plane, i.e. the transform, recovers the original information, i.e. the seismic section. If spatial filtering is done on the transform to remove certain frequency components, the recovered information is modified in comparison to the original data. Thus, certain undesired frequency components can be removed from the input data giving a more readable output.

The equipment needed to do this operation is quite simple. Required is (1) a source of coherent light, (2) a photographic shutter, (3) a transparency containing input seismic information. (4) an objective to diffract the input information and form its transform, (5) a spatial filter, (6) a second objective to diffract the transform, and (7) an image detector means to record the filtered output.

Figure 1:
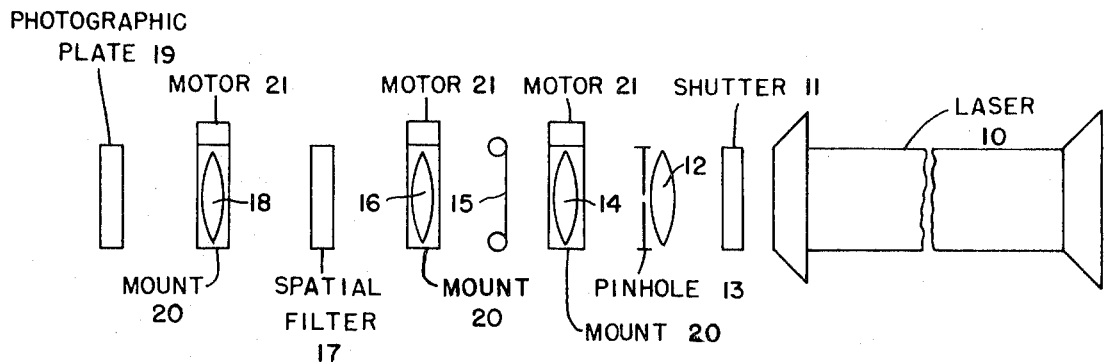
FIG. 1 is a drawing showing a typical bench setup for optical processing data by spatial filtering.

Referring to FIG. 1, laser 10 transmits a beam of coherent light which is either passed or blocked by photographic shutter 11, depending on whether it is open or closed. Assuming shutter 11 is open, focusing lens 12 focuses the laser output beam on pinhole filter 13. An essentially monofrequency beam is passed by pinhole filter 13 which is acted on by beam expander 14. Input data 15 in the form of a variable density or variable area seismic record is placed in front of beam expander 14 in order to modulate the laser beam. Transform objective 16 produces the Fourier transform of the input data, i.e. distributes the seismic information according to frequency content. Spatial filter 17 is positioned in the transform plane so that unwanted frequency components can be removed by masking particular regions. Reconstruction objective 18 then diffracts the transform so that it is converted into the original object, i.e. a seismic section which is recorded by photographic plate 19.

In accordance with applicant's optical element assembly invention, beam expander 14, transform objective 16, and reconstruction objective 18 are contained in special rotating mounts 20 driven by motors 21. Mounts 20 are synchronously rotated in very small steps (e.g. 10 seconds of arc). At the conclusion of each step, shutter 11 is triggered to make a partial exposure of photographic plate 19. Preferably, at least ten such exposures are made in compositing each record.

It is important the mounts 20 rotate at different angular velocities since otherwise there would be no discrimination against the optical noise. Although it is preferable that rotation of the lenses be discontinued when plate 19 is being exposed (in order to minimize vibration, etc.), in most cases the lenses in question can be rotated continuously and shutter 11 opened periodically for short exposures until the necessary total exposure time is obtained.

It is obvious that extremely stable, adjustable optical element mounts are required in order to align an optical element and then rotate it in a plane perpendicular to the optical axis. Accordingly, applicant found it necessary to develop a mounting system or assembly which allows movement and adjustment of the lens along three coordinates, as well as providing rotation relative to the optical axis.

Figure 2:
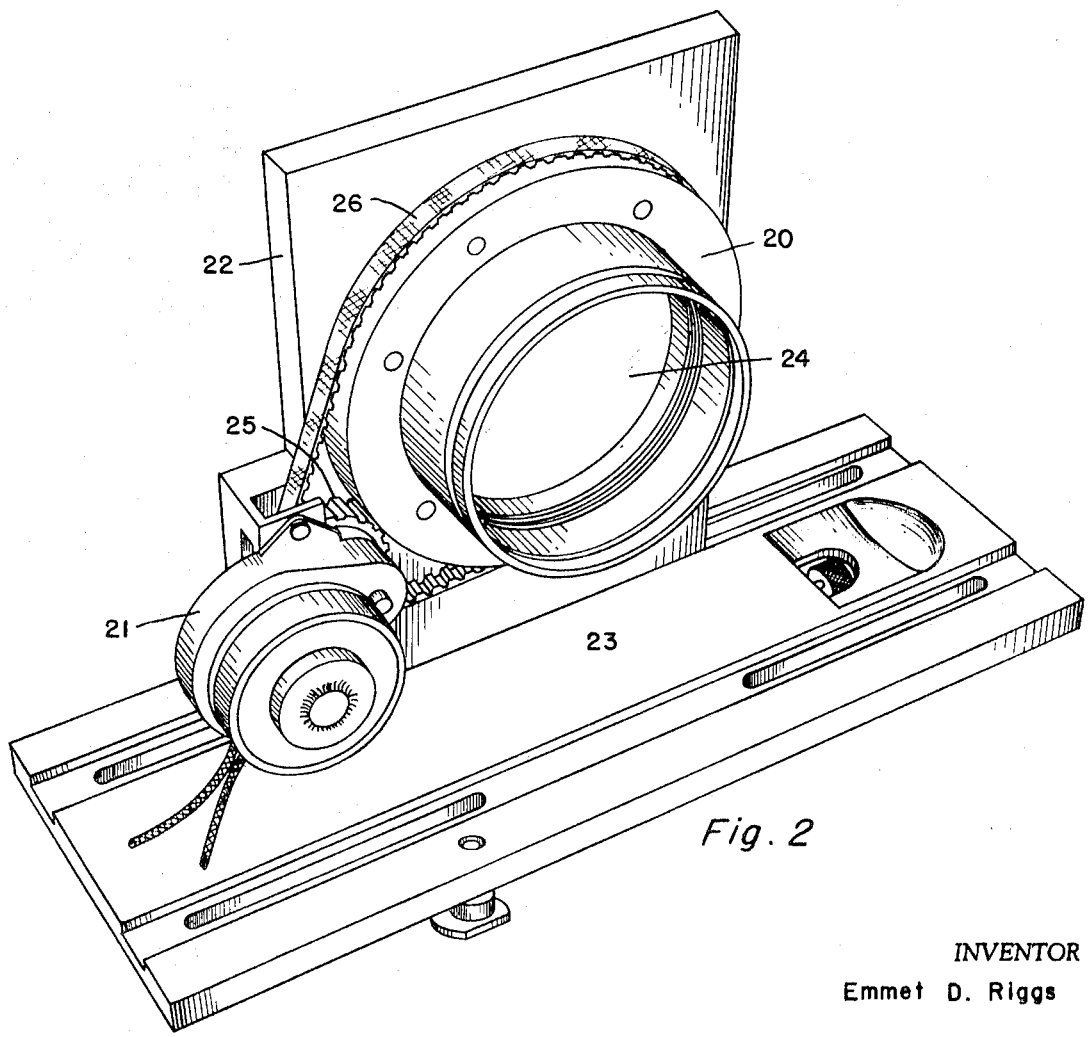

Referring to FIG. 2, mount 20 is rotatably mounted in vertical arm 22 of frame member 23 and holds optical element 24. A bearing system (not shown) comprising a sleeve-type bearing in the form of two thin sections of bearing material forming as widely as possible spaced apart parallel line contact surfaces is employed between stationary arm 22 and mount 20. Frame member 23 attaches to and is movably adjustable with respect to an optical bench or the like. Motor 21 is a small hysteresis synchronous motor which revolves mount 20 in the bearing system. Motor 21 is a gear type with a shaft output of one-twentieth revolution per minute turning pulley 25. Drive belt 26 connects pulley 25 to mount 20 so that motor 21 rotates mount 20.

Another factor to consider in the design of a rotating mount was how to effectively change its angular velocity relative to another rotating mount. This was done by changing the pulley size on the drive motor shaft. Thus, the radius of each drive pulley is made different by a few thousandths of an inch so that the effective angular velocity of the several mounts will differ from one another by one to two percent.

It becomes obvious that if the shutter is to be manually released at least 10 times during each exposure, the process becomes inefficient and subject to error since the work is done in total darkness. Accordingly, preferably electrical control apparatus is used for automatically cocking and releasing the shutter after each rotational step of the several rotating lenses.

Figure 3:
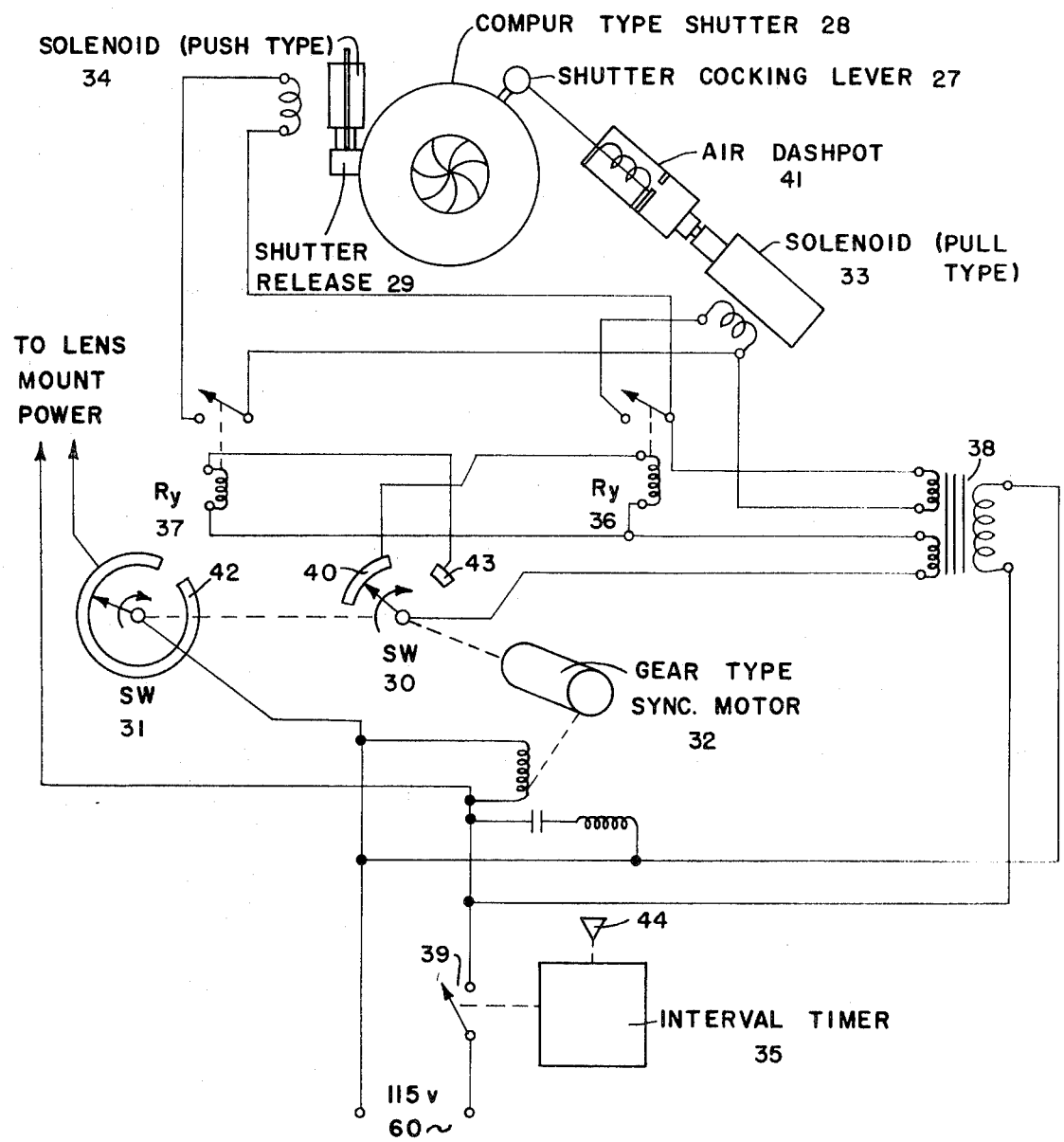
FIG. 3 is a schematic drawing showing means for automation of applicant's method for optical processing.

Referring to FIG. 3, there are four major functions in automation of applicant's inventive process. The first is a means for activating cocking lever 27 in order to cock photographic shutter 28. The second is a means for actuating shutter release 29. Thirdly, it is necessary to supply timing means so that cycling can be stopped after a predetermined time. As a fourth function, switch means is needed to interrupt power to motors driving the rotating mounts so that rotation can be halted during each exposure if desired. The aforesaid functions are achieved by a combination with the above of rotary switches 30 and 31, drive motor 32, solenoids 33 and 34, interval timer 35, relays 36 and 37, transformer 38, and other elements subsequently discussed.

As an example of the operation of the above equipment, let us assume that it is desired to make 10 exposures of one one-hundredth second each. Shutter 28 is accordingly set at one one-hundredth of a second. Also assume that motor 32 operates at 5 revolutions per minute and that there is one exposure per revolution. This means that the total time of a complete cycle will be 2 minutes. Interval timer 35 is therefore set for 2 minutes and master switch 39 is closed to start the operation. (Timer 35 is the automatic reset type having a 5-minute time range delay calibrated in increments of 10 seconds.)

Assuming rotary switches 36 and 37 are in the positions shown, closing switch 39 applies power to motor 32 and to transformer 38 which in turn applies power to contact 40 of switch 30. This energizes the coil of relay 36, applying power to the winding of pull-type solenoid 33. Air dashpot 41 is operated by solenoid 33 to cock shutter lever 27. (The dashpot is not essential but provides a gentle application of force to the shutter from the cocking solenoid dampening out vibrations.)

Each of the optical element mount motors are in operation as long as contact 42 of switch 31 is closed. However, as motor 32 drives switches 30 and 31 in a clockwise direction, contact 40 is first broken and then contact 42. When contact 40 is broken, shutter cocking solenoid 33 is deenergized and spring-loaded dashpot 41 returns to its unenergized position. Breaking contact 42 cuts off the power to the rotating lens mounts causing rotation to stop. As switches 30 and 31 continue to rotate, contact 43 is made, energizing push-type solenoid 34 which in turn actuates shutter release 29. Subsequently, contact 42 of switch 31 is closed again, causing the lens elements to rotate. As motor 32 continues to drive switch 30, contact 40 is made again, cocking shutter lever 27 for a second time. Thus, a complete cycle has been automatically performed.

During the above-described cycle, interval timer 35 would operate continually and show an elapsed time of 20 seconds. In our particular example, there will be an additional nine revolutions (a total of 10 before interval timer 35 actuates master switch 39, turning off the apparatus. (Should it be desired to interrupt operations while timer 35 is still running, override switch 44 may be depressed.)

A normal seismic cross section, recorded at a first speed, is played back at a second speed to produce a predetermined size reduction. This film is then copied with a preselected film-to-object spacing to give a further reduction. Knowing the focal length of the transform objective, the spatial relation of any frequency component in the transform plane is readily determined and the design of filters becomes a simple process.

As already discussed, the usual approach to optical filters is to magnify the transform by optical methods and then use mechanical (metal) masks of a convenient size. This magnification is the source of much of the noise in conventional systems. In the present equipment, applicant elected to omit the magnification and work with the original transform. Since this transform is of the order of 1 cm square (using lens with 20 cm. focal length), the fabrication of a series of mechanical masks was found to be mechanically impractical. Photographic masks, where first tried, were also abandoned because the clear area on a film is, in reality, filled with a layer of transparent crystals imbedded in a gelatin matrix. These crystals were found to produce severe dispersion from the zero order in the transform. This problem was solved by developing a method of removing (centering and punching) the very low frequency (0–3 to 0–6 c.p.s.) section of the mask. This hole, centered at zero (DC) frequency on the mask, is of the order of 0.035 mm. for most transforms and can be varied to 6, 12, 18, or 24 cycles. This hole is absolutely essential for obtaining an optimum mask.

Applicant's micromasks are produced by photographing a calibrated white field on which black paper cutouts of the proper dimension have been placed. High contrast film is used at a fixed object-to-film distance. The result is a custom tailored filter which can be produced and used in a matter of minutes. The photographic mask (film positive) is mounted in a demountable metal holder and is ready for use. If the first mask is not satisfactory, then a modified version can be produced rapidly. Some subsequent seismic section may require the same filtering, so existing masks from the file can be used from time to time.

What is claimed is:

1. A method for optically processing signals by spatial filtering comprising synchronously rotating the optical elements acting on the signals at different angular velocities, recording a partial exposure of the output information at each of a preselected number of incremental rotational steps, and adding the resulting partial exposures to produce a composite exposure characterized by an improved signal to optical noise ratio.

2. A method for optically processing signals by spatial filtering comprising synchronously rotating the optical elements acting on the signals at different angular velocities, discontinuing rotation at predetermined time intervals, recording a partial exposure of the output information at each rotational pause, and adding the resulting partial exposures to produce a composite exposure characterized by an improved signal to optical noise ratio.

3. In apparatus for optically processing signals by spatial filtering having a source of coherent light, a photographic shutter, a transparency containing input information, various optical elements, and image detector means, the improvement comprising automatic cocking and release means connected to said shutter, rotatable mounts for certain of said optical elements, synchronous motors for driving each of said mounts, first and second rotary switch means for actuating said cocking and release means and said synchronous motors, an electric motor for synchronously rotating said first and second switch means, and an interval timer to shut off said apparatus after a predetermined time.

* * * * *